United States Patent [19]  [11] Patent Number: 4,872,542
Enneking                                [45] Date of Patent: Oct. 10, 1989

[54] STEEP ANGLE CONVEYOR
[75] Inventor: Gregor Enneking, Neuenkirchen, Fed. Rep. of Germany
[73] Assignee: Fried. Krupp Gesellschaft mit beschränkter Haftung, Essen, Fed. Rep. of Germany
[21] Appl. No.: 132,446
[22] Filed: Dec. 14, 1987
[30] Foreign Application Priority Data
Dec. 13, 1986 [DE] Fed. Rep. of Germany ....... 3642718
[51] Int. Cl.⁴ .............................................. B65G 41/00
[52] U.S. Cl. .................................. 198/312; 198/861.4
[58] Field of Search ............... 198/311, 312, 313, 303, 198/304, 300, 317, 318

[56] References Cited
U.S. PATENT DOCUMENTS
855,425   5/1907  Arden .
4,036,377 7/1977  Weber .
4,489,818 12/1984 Franke et al. ........................ 198/311
4,730,716 3/1988  Enneking et al. ................... 198/304

FOREIGN PATENT DOCUMENTS
740232   8/1943  Fed. Rep. of Germany .
942079   4/1956  Fed. Rep. of Germany .
2943525  5/1981  Fed. Rep. of Germany .
0154352  3/1982  Fed. Rep. of Germany .
3303059  3/1985  Fed. Rep. of Germany .
8613315  11/1986 Fed. Rep. of Germany .
2021066  11/1979 United Kingdom .
2175562  12/1986 United Kingdom .

OTHER PUBLICATIONS
Conveyor Belt Technology, vol. 4, No. 1, Mar. 1984, "New Dimensions in Capacity and Elevation with the Flexofast Conveyor System", U. Kunstmann and J. W. Paelke, Germany.

Primary Examiner—Robert J. Spar
Assistant Examiner—D. Glenn Dayoan
Attorney, Agent, or Firm—Spencer & Frank

[57] ABSTRACT

A steep angle conveyor for conveying bulk materials from a lower level to an upper level, the conveyor including: a one-piece bridge structure having two opposed ends each arranged to be disposed at a respective one of the levels; an endless conveyor extending along the bridge structure; a first intermediate frame to which is articulated that one of the ends which is arranged to be disposed at the lower level; a second intermediate frame to which is articulated that one of the ends which is arranged to be disposed at the upper level; an adjusting device connected for adjusting the position of the first intermediate frame in a vertical direction; first and second supporting devices each arranged to support a respective one of the intermediate frames while permitting each of the intermediate frames to be rotatable relative to its associated supporting device; and a member supporting the first intermediate frame on the first supporting device for permitting the first intermediate frame to be displaceable relative to the first supporting device in a horizontal direction.

7 Claims, 2 Drawing Sheets

4,872,542

STEEP ANGLE CONVEYOR

BACKGROUND OF THE INVENTION

The present invention relates to a steep angle conveyor for transporting bulk materials from ground at one level to ground at another level, which conveyor includes a bridge structure and an endless conveyor belt.

German Pat. No. 740,232 discloses a conveyor for transporting bulk materials from one plane to another plane. The bridge of this conveyor is supported at two points of its upper end and by way of a rotary connection on a tracked vehicle and at its lower end at one point and by way of a ball joint on another tracked vehicle, with the ball joint permitting longitudinal displacement of the bridge relative to the tracked vehicle. If longitudinal displacement of the bridge with respect to the tracked vehicle is required, either the support moves out of the center plane of the tracked vehicle or the bridge support slides beyond this connection. In the former case, the tractor chains are stressed eccentrically which requires excess dimensions, while in the latter case, energy is required to displace the bridge in the direction toward the upper plane relative to the lower tracked vehicle and to raise the lower end as a whole.

Federal Republic of Germany Pat. No. 942,079 discloses a steep angle conveyor which includes a vertical tower structure and an articulatedly supported essentially horizontal bridge structure thereabove. However, the number of parts in this structure makes it more expensive.

SUMMARY OF THE INVENTION

It is an object of the present invention to overcome the above-mentioned drawbacks in a steep angle conveyor of the above-mentioned type, with the conveyor also being movable in one plane.

The above and other objects are accomplished, according to the present invention, by a steep angle conveyor for conveying bulk materials from a lower level to an upper level, the conveyor comprising: a one-piece bridge structure having two opposed ends each arranged to be disposed at a respective one of the levels; an endless conveyor extending along the bridge structure; a first intermediate frame to which is articulated that one of the ends which is arranged to be disposed at the lower level; a second intermediate frame to which is articulated that one of the ends which is arranged to be disposed at the upper level; means connected for adjusting the position of the first intermediate frame in a vertical direction; first and second supporting devices each arranged to support a respective one of the intermediate frames while permitting each of the intermediate frames to be rotatable relative to its associated supporting device; and means supporting the first intermediate frame on the first supporting device for permitting the first intermediate frame to be displaceable relative to the first supporting device in a horizontal direction.

The inclusion of a first, or lower, horizontally adjustable intermediate frame permits length compensation of the supporting structures when they move away from or toward one another during movement of the entire steep angle conveyor, without the bridge structure being raised or the bridge end being stressed other than in the center of the supporting structure.

According to one advantageous feature of the invention, the bridge structure is bent in the vicinity of the end which is arranged to be disposed at the upper level. This helps to assure that the steep angle conveyor can be used even if the two levels are separated by a great vertical distance if given minimum or safety distances are observed for the second, or upper, supporting structure relative to the edge of the slope between the two levels. In further accordance with the invention, the conveyor is provided with: a double ball ring, or ball-bearing turntable, supporting the second intermediate frame on its associated supporting device; a scaffold-type frame supported by the double ball ring; and a discharge conveyor belt supported by the scaffold-type frame. The double ball allows the discharge conveyor to be pivoted independently of the orientation of the bridge structure.

One preferred embodiment of the invention is illustrated in the drawing figures and will be described in greater detail below.

DESCRIPTION OF THE PREFERRED EMBODIMENTS

Figure 1:
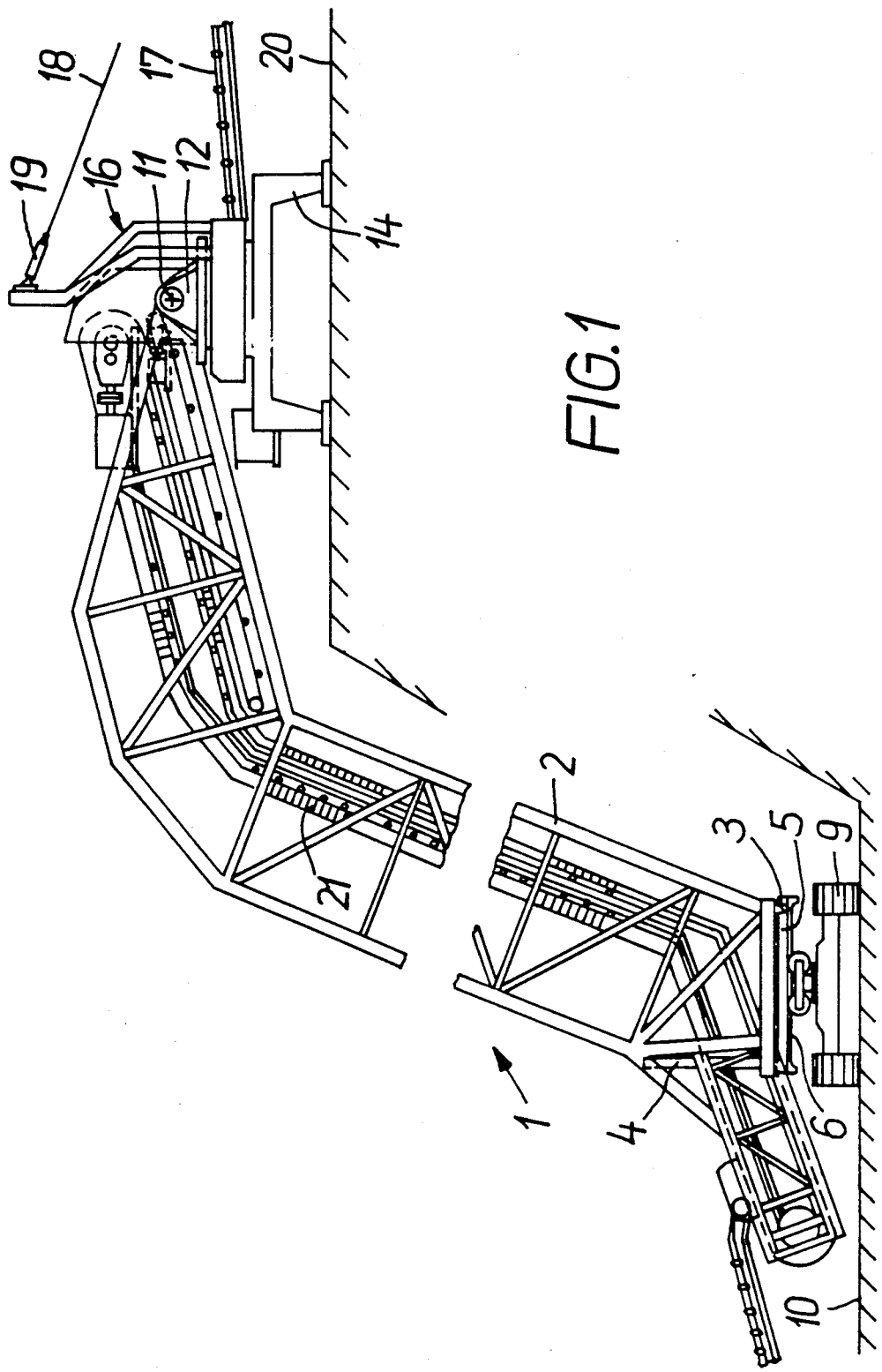
FIG. 1 is a side elevational view of a steep angle conveyor according to the preferred embodiment in its operating position.
Figure 2:
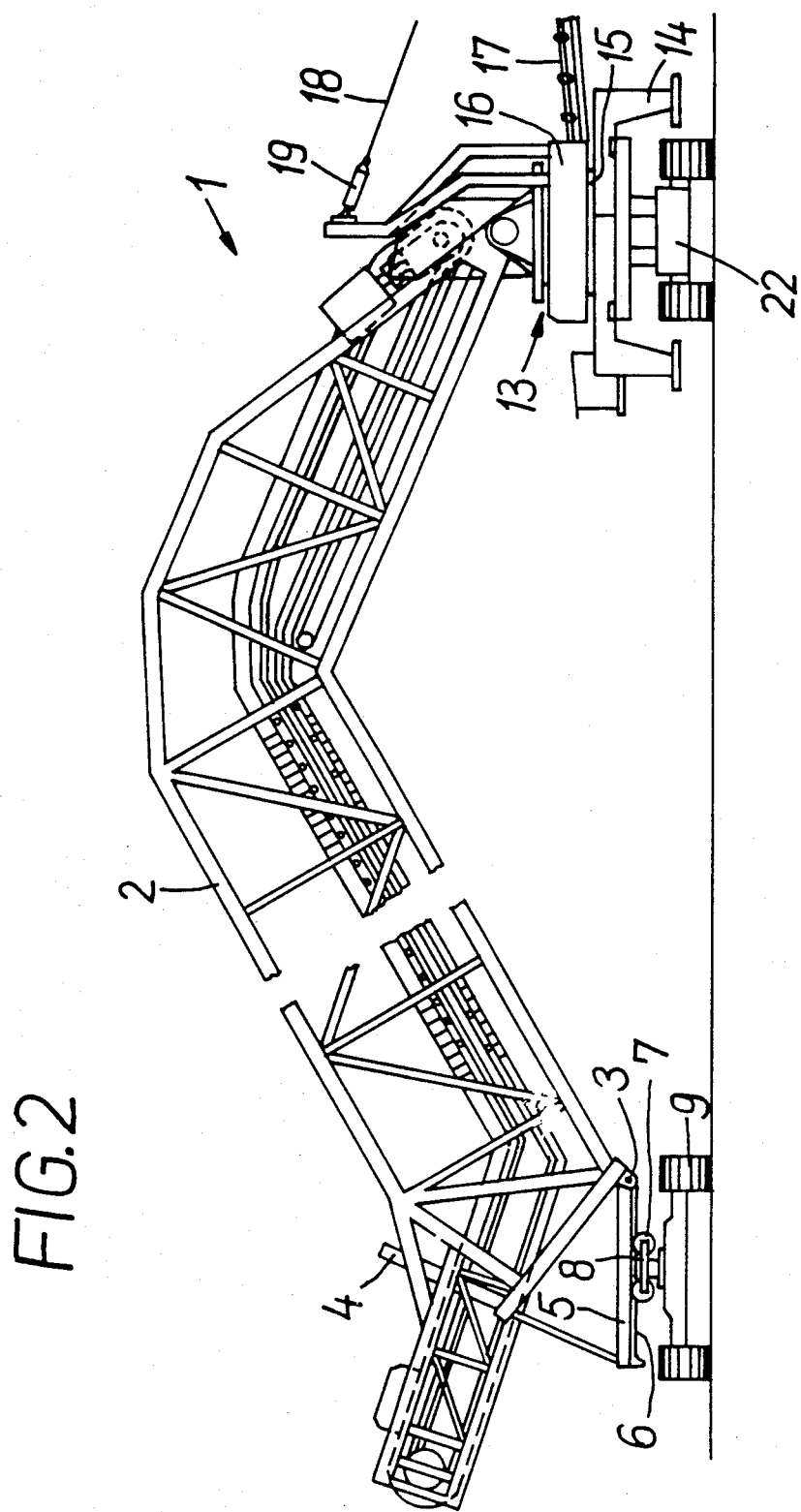
FIG. 2 is a side view of the steep angle conveyor of FIG. 1 in a transporting position.

FIGS. 1 and 2 show the steep angle conveyor 1 which includes a one-piece bridge structure 2 whose lower end is supported on a platform or, more precisely, on an intermediate frame 5, on the one hand, by way of a hinge 3 having a horizontal axis perpendicular to the plane of the drawing and, on the other hand, by way of two hydraulic cylinders 4. The underside of intermediate frame 5 is provided with rails 6 via which frame 5 is supported on wheels or rollers 7 of a frame or stand 8, identified in FIG. 2. Frame or stand 8 is in turn supported by way of a ball joint (not shown in detail) in the center of a caterpillar, or tracked, drive 9 disposed on a lower ground surface or a lower plane 10.

The upper end of bridge structure 2 is bent relative to the lower end thereof and is supported by a horizontal shaft 11 disposed parallel to the axis of hinge 3. Shaft 1 is carried by an intermediate frame, or intermediate support, 12 which, in turn, is supported by a rotary ball ring 13 mounted in the center of a gantry 14. A scaffold-type frame 16 is mounted on gantry 14 via a further ball ring 15, with a discharge conveyor belt 17 being articulated to frame 16. The position of conveyor belt 17 in the vertical direction is adjustable by means of a cable 18 and a pulling device 19.

In the operating position shown in FIG. 1, gantry 14 rests on an upper ground surface or an upper plane 20.

A steep angle conveyor belt 21 extends along the entire length of bridge structure 2. Conveyor belt 21 can have the form described, for example, by Kunstmann et al in "New Dimensions in Capacity and Elevation with the FLEXOFAST ® Conveyor System", which appeared in the periodical *Bulk Solids Handling*, Vol. 4, No. 1, March, 1984, pages 105–112.

Gantry 14 has such a configuration that a load transporting device 22, as disclosed for example in FRG-OS [Federal Republic of Germany Laid-Open Application] 2,416,642 and counterpart U.S. Pat. No. 4,036,377, is able to move under and raise gantry 14 to carry it along for transporting the steep angle conveyor. If the steep angle conveyor is moved from the highest operating position shown in FIG. 1 to a lower plane, or to the same plane 10 as drive 9 for transporting the steep angle conveyor as shown in FIG. 2–or vice versa–hydraulic cylinders 4 are telescoped out in such a manner that intermediate frame 5 is always in a horizontal position. This can be accomplished, for example, in that pressure medium is supplied in a known manner to hydraulic cylinders 4 by way of a switching device which operates, for example, according to the principle of a bubble level and is fixed relative to intermediate frame 5, or a pendulum connected therewith.

According to a modified version of the above-described embodiment, the upper and lower ends of bridge structure 2 may each be mounted on a track-laying vehicle or a gantry. Additionally, spindle drives (not shown) may be employed between lower intermediate frame 5 and bridge structure 2 instead of hydraulic cylinders 4.

The invention now being fully described, it will be apparent to one of ordinary skill in the art that many changes and modifications can be made thereto without departing from the spirit or scope of the invention as set forth herein.

What is claimed is:

1. A steep angle conveyor for conveying bulk materials from a lower level to an upper level, said conveyor comprising: a one-piece bridge structure having two opposed ends each arranged to be disposed at a respective one of the levels; an endless conveyor extending along said bridge structure; a first intermediate frame to which is articulated that one of said ends which is arranged to be disposed at the lower level; a second intermediate frame to which is articulated that one of said ends which is arranged to be disposed at the upper level; first and second supporting devices each arranged to support a respective one of said intermediate frames while permitting each of said intermediate frames to be rotatable relative to its associated supporting device; and means supporting said first intermediate frame on said first supporting device for angularly adjusting said intermediate frame into a horizontal orientation relative to said first support device and said bridge structure so as to permit said first intermediate frame to be displaceable relative to said first supporting device in a horizontal direction 2. Steep angle conveyor as defined in claim 1 wherein said bridge structure is bent in the vicinity of said end which is arranged to be disposed at the upper level.

3. Steep angle conveyor as defined in claim 2 further comprising: a double ball ring supporting said second intermediate frame on its associated supporting device; a scaffold-type frame supported by said double ball ring; and a discharge conveyor belt supported by said scaffold-type frame.

4. Steep angle conveyor as in claim 1, further comprising means for adjusting the vertical position of said first intermediate frame and the one of said ends articulated thereto relative to said second intermediate frame and the other of said ends.

5. Steep angle conveyor as in claim 4, wherein said supporting means comprises means for pivotally supporting said first intermediate frame, and means, fixed between said bridge structure and said first intermediate frame, for pivoting said first intermediate frame relative to said bridge structure and said means pivotally supporting, into a horizontal orientation.

6. Steep angle conveyor as in claim 1, wherein said supporting means comprises means for pivotally supporting said first intermediate frame, and means, fixed between said bridge structure and said first intermediate frame, for pivoting said first intermediate frame relative to said bridge structure and said means pivotally supporting, into a horizontal orientation.

7. A step angle conveyor as in claim 1, further comprising means for adjusting the position of the second intermediate frame and the end of the bridge structure articulated thereto vertically relative to the second intermediate frame and the end of the bridge structure articulated thereto.

* * * * *